United States Patent
Mantri et al.

(10) Patent No.: US 12,003,607 B2
(45) Date of Patent: Jun. 4, 2024

(54) SYSTEMS AND METHODS FOR PACKET-BASED FILE COMPRESSION AND STORAGE

(71) Applicant: Verizon Patent and Licensing Inc., Basking Ridge, NJ (US)

(72) Inventors: Viraj C. Mantri, Mumbai (IN); Ramasubramanian Radhakkrishnan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/818,393

(22) Filed: Aug. 9, 2022

(65) Prior Publication Data

US 2022/0394108 A1     Dec. 8, 2022

Related U.S. Application Data

(63) Continuation of application No. 16/951,766, filed on Nov. 18, 2020, now Pat. No. 11,463,556.

(51) Int. Cl.
| | |
|---|---|
| *H04L 29/06* | (2006.01) |
| *G06F 3/06* | (2006.01) |
| *H03M 7/30* | (2006.01) |
| *H04L 9/06* | (2006.01) |
| *H04L 69/04* | (2022.01) |

(52) U.S. Cl.
CPC .......... *H04L 69/04* (2013.01); *H03M 7/3059* (2013.01); *H04L 9/0656* (2013.01)

(58) Field of Classification Search
CPC ... H04L 69/04; H04L 9/0656; H04L 2209/30; H04L 2209/34; H03M 7/3059; H03M 7/30
See application file for complete search history.

(56) References Cited

U.S. PATENT DOCUMENTS

| | | | |
|---|---|---|---|
| 9,390,099 B1 * | 7/2016 | Wang | H03M 7/707 |
| 10,135,955 B2 * | 11/2018 | Akhter | H04L 69/08 |
| 10,558,699 B2 * | 2/2020 | Maybee | G06F 16/2365 |
| 10,698,854 B1 * | 6/2020 | Weishaupt | G06F 13/4068 |
| 2014/0298454 A1 * | 10/2014 | Heng | G06F 21/55 726/22 |
| 2016/0337255 A1 | 11/2016 | Balasubramanian et al. | |
| 2016/0360002 A1 * | 12/2016 | Cansino | G06F 16/951 |
| 2017/0068477 A1 | 3/2017 | Yu | |

(Continued)

*Primary Examiner* — Schquita D Goodwin

(57) ABSTRACT

A system described herein may provide a technique for compressing sets of files using a packet-based conversion algorithm. The algorithm may compress and decompress files using a packet-based approach, whereby packet-sized sections of file data are compressed and arranged in a specified order such that the sections may be retrieved, decompressed, and reassembled to restore the original files as needed. The packet-based approach may allow for the size of a file set to be dramatically reduced, while the resulting compressed data may not be easily accessed by unauthorized entities. Compression and decompression may utilize a pointer associated with each file in the set of files. The pointer may be generated based on data associated with a file, such as file name, size, and/or other attributes or metadata. The compressed packets may be arranged relative to the pointer within a compressed file such that the packets may be identified and decompressed.

20 Claims, 10 Drawing Sheets

(56) References Cited

U.S. PATENT DOCUMENTS

| | | | |
|---|---|---|---|
| 2018/0198765 A1* | 7/2018 | Maybee | G06F 3/0643 |
| 2019/0052384 A1 | 2/2019 | Kwak et al. | |
| 2019/0087979 A1* | 3/2019 | Mammou | H04N 19/597 |
| 2021/0029223 A1* | 1/2021 | Wegener | G06F 3/061 |
| 2021/0034598 A1* | 2/2021 | Arye | G06F 16/288 |
| 2021/0201133 A1* | 7/2021 | Kwon | G06N 3/063 |
| 2021/0336632 A1* | 10/2021 | Bergland | H03M 7/3059 |
| 2022/0035526 A1* | 2/2022 | Lv | G06F 3/064 |
| 2022/0069840 A1* | 3/2022 | Häggebrant | H03M 7/6005 |
| 2022/0368347 A1* | 11/2022 | Chandak | G16B 50/50 |
| 2023/0207069 A1* | 6/2023 | Cheung | G16B 50/50 |
| | | | 707/693 |

* cited by examiner

SYSTEMS AND METHODS FOR PACKET-BASED FILE COMPRESSION AND STORAGE

CROSS-REFERENCE TO RELATED APPLICATION

This application is a Continuation of U.S. patent application Ser. No. 16/951,766, filed on Nov. 18, 2020, titled "SYSTEMS AND METHODS FOR PACKET-BASED FILE COMPRESSION AND STORAGE," the contents of which are herein incorporated by reference in their entirety.

BACKGROUND

Wireless user equipment ("UE"), such as mobile telephones or other wireless communication devices, may utilize media files such as images and video. Such media files and/or other files may consume storage at the UE or other resources.

DETAILED DESCRIPTION OF THE PREFERRED EMBODIMENTS

The following detailed description refers to the accompanying drawings. The same reference numbers in different drawings may identify the same or similar elements.

Embodiments described herein provide for packet-based conversion techniques, to compress sets of files using a packet-based approach, whereby packet-sized sections of file data are compressed and arranged in a specified order such that the sections may be retrieved, decompressed, and reassembled to restore the original files as needed. Compression and decompression may utilize a pointer associated with each file in the set of files. The pointer may be generated based on data associated with a file, such as file name, size, and/or other attributes or metadata. The compressed packets may be arranged relative to the pointer within a compressed file such that the packets may be identified and decompressed using the pointer.

At least a portion of the compressed packet data may be arranged using a particular pattern design type. Pattern designs may be associated with various arrangement types, such as palindrome (i.e., a sequence that is the same forwards and backwards), bubble sort (i.e., a sequence sorted by value), etc. Pattern designs may be associated with various "shapes" of data, such as star, box, diamond, square, etc., where each shape defines sets of locations associated with valid or compressed data, where such locations may resemble the various shapes when plotted to a two-dimensional matrix. Such pattern designs will be described in more detail below. The pointer value may be used to select from among available pattern design types. The pointer value may be used to dynamically generate a unique pattern design that combines multiple design types.

The packet-based approach of some embodiments may allow for the size of a file set to be dramatically reduced, while the resulting compressed data may not be extracted by unauthorized entities. In addition, many individual files may be combined into a single compressed file that retains file and directory information, thus reducing overhead and complexity by allowing many files and file types to be combined into a single output format. Using the reference pointers, each individual file may be located and extracted without requiring decompression of the entire compressed file.

Figure 1:
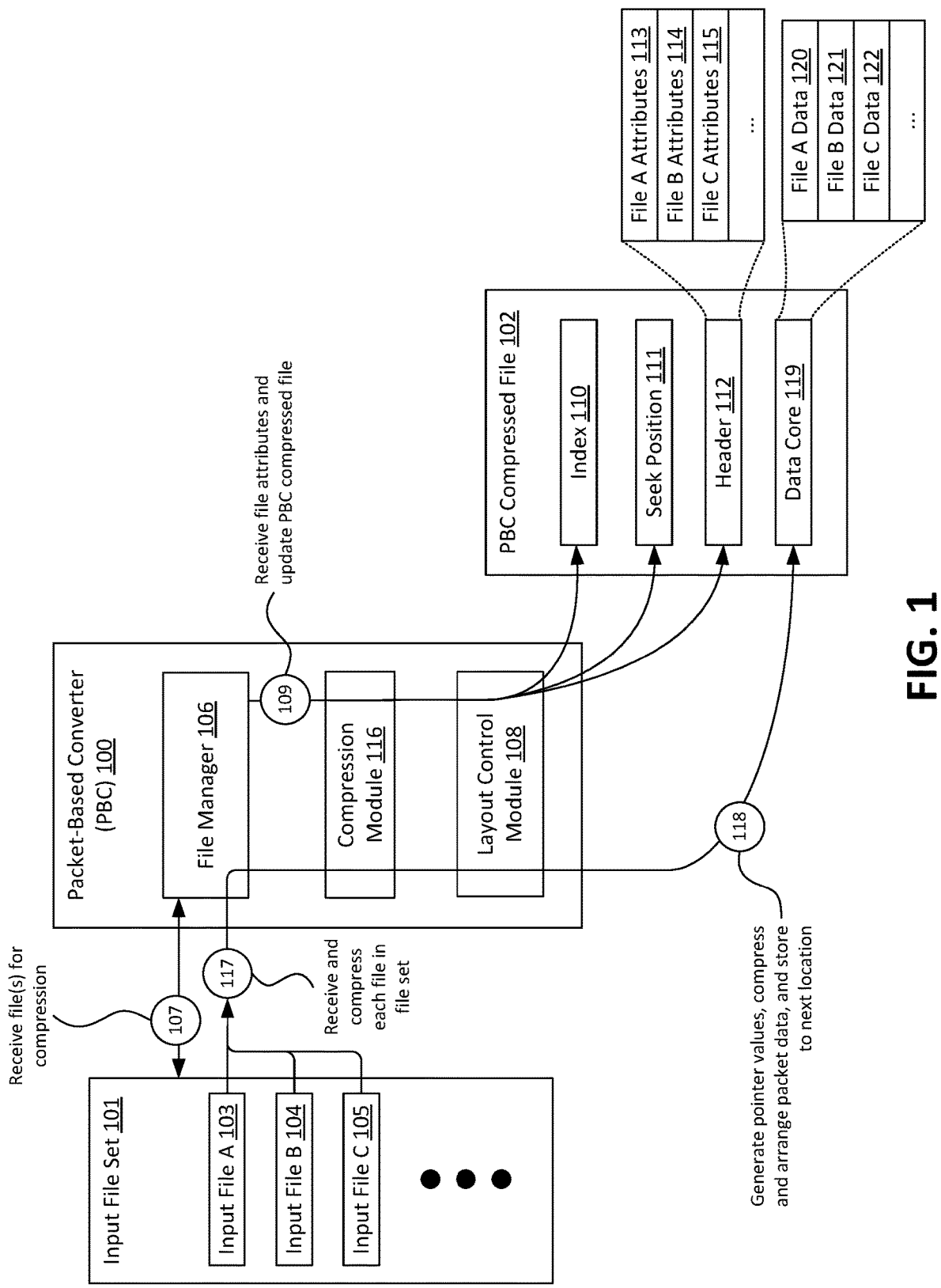
FIG. 1 illustrates an example overview of one or more embodiments described herein, in which a set of files is compressed using packet-based conversion.

FIG. 1 illustrates, for example, use of a packet-based converter ("PBC") 100 to compress an input file set 101 into a single compressed file 102 (referred to as "PBC compressed file 102"). In this example, input file set 101 may include input files 103-105. In practice, input file set 101 may include a different quantity of input files (e.g., fewer than or more than the three input files 103-105 of this example). Input files 103-105 may be files of various types, and/or containing different types of content, that may be arranged or sorted in various appropriate ways (e.g., by name, creation date, and/or other sorting criteria). Some embodiments of PBC 100 may be associated with conversion of media files including image files, video files, multimedia files, and/or other similar files. Other embodiments of PBC 100 may be associated with other types of files. As one example, input file set 101 may be associated with a social media application running on a UE (e.g., may include executable files, configuration files, resource files, and/or other suitable files associated with the social media application).

PBC 100 may include a file manager 106 that may be able to navigate folders or directories associated with various operating systems or devices. File manager 106 may be able to read, compress, decompress, store, and/or otherwise manipulate or process files, folders, and/or directories. File manager 106 may include or implement various application programming interfaces ("APIs") and/or other suitable communication pathways that may allow interaction with external resources such as local or remote applications, servers, and/or other appropriate resources.

As shown, PBC 100 may receive (at 107) files for compression. File manager 106 may receive a selection or identification of files that may include, for instance, a directory identifier and a list of file types to be included in PBC compressed file 102. The directory identifier, list of files types (and/or other filter data), and/or other appropriate information may be received from a resource such as an application or operating system. File manager 106 may retrieve all files nested under the directory identifier that match any specified filters in order to generate or identify input file set 101. For example, file manager 106 may receive a folder identifier (e.g., a folder with name "Vacation 2018") from the social media application and may generate a list of files included in the folder designated by the folder identifier and any sub-folders thereof.

PBC 100 may include a layout control module 108 that may define or otherwise control the layout or arrangement of data included in PBC compressed file 102. Layout control module 108 may associate data extracted from PBC compressed file 102 with a file from input file set 101 and indicate a location within the file for each packet (and associated decompressed data) retrieved from PBC compressed file 102. File manager 106 may interact with layout control module 108 (or vice versa) during compression and/or decompression to manipulate compressed or decompressed packet data in order to compress or restore a set of files.

File manager 106 and/or layout control module 108 may receive (at 109) file attributes of files included in input file set 101 and update PBC compressed file 102 based on the retrieved attributes. Such attributes may include, for instance, file name, file size, file type, and/or other appropriate information or metadata.

As shown, PBC compressed file 102 may include an index 110, seek position 111, and header 112. An example file structure for PBC compressed file 102 will be described in more detail in reference to FIG. 5 below. Index 110 may include, for example, an indication of a quantity of entries included in header 112. Seek position 111 may indicate a location or pointer (e.g., a byte address) for reading and/or writing compressed data to PBC compressed file 102. Header 112 may include file attributes 113-115 associated with each input file 103-105 in input file set 101. As one example, file A attributes 113 may include file name and file size. File attributes 113-115 may include information such as a directory, folder, or sub-folder associated with a file, such that files may be restored to a previous or known location. In some embodiments, file attributes 113-115 may be used to select or indicate one or more compression properties, such as arrangement type (e.g., a palindrome, star, bubble sort, box, diamond, square, or other pattern design type). For instance, PBC 100 may generate, based on file attributes 113-115, a random sequence identifier ("RSID") for each file in input file set 101 and arrangement type may be generated or selected based on the RSID.

Header 112 may be arranged such that each set of file attributes 113-115 has a known location within header 112. For instance, each set of attributes may be represented using a fixed number of bytes, packets, or other appropriate units. As another example, each set of attributes may be associated with a spacing interval (e.g., a new set of attributes may begin every ten bytes). In this way, if a starting location for header 112 information within PBC compressed file 102 is known, a location of header information associated with a particular file, such as file C attributes 115 associated with file C 105, may be determined based on the ordering of files within input file set 101 and an offset that is equal to (or is otherwise derived from) the spacing interval.

PBC converter 100 may include compression module 116. Compression module 116 may interact with file manager 106 and/or layout control module 108 to receive and compress (at 117) each file in input file set 101. Compression module 116 may be able to implement various compression algorithms, such as a packets binary reversing algorithm ("PBRA") and/or a sequence padding algorithm ("SPA") that will be described in more detail in reference to FIG. 3 and FIG. 4 below. Compression algorithms used or implemented by PBC converter 100 may include lossless compression techniques such as entropy encoding, Huffman coding, prediction by partial matching ("PPM"), run-length encoding ("RLE"), and/or other appropriate compression techniques. Some embodiments of PBC converter 100 may implement or use lossy compression techniques, if appropriate for a particular file type or requesting resource (e.g., a requesting resource may indicate that lossy compression may be used for particular file types), such as discrete cosine transform ("DCT").

File manager 106 may receive (at 117) each file and divide the file into chunks or sections of data (referred to as "packets"). Each packet may be associated with a specified size or length, such as a number of bytes. Packet size may differ between compressed and uncompressed data. For instance, uncompressed data may be associated with eight byte packets while compressed data may be associated with four byte packets. Compressed and/or uncompressed packet size may be indicated in header 112 in some embodiments. As described herein, input data may be compressed and arranged at a packet level. In this way, input data may be efficiently processed and arranged, while adding a layer of complexity or obfuscation to any attempt to access the compressed data, by requiring knowledge of the packet size.

Each packet, or set of packets, may be passed to compression module 116. Compression module 116 may generate (at 118) pointer values, compress and arrange the received packet data, and store, via layout control module 108 and/or file manager 106, the resulting compressed data to a next available location in data core 119. Data core 119 may serve as a repository for compressed file data within PBC compressed file 102, where the compressed file data may include header information, metadata, binary data, and/or types of data that may be used to restore compressed files. A starting position of data core 119 may be indicated by seek position 111, such as by indicating a byte number, packet number, and/or other information indicating the position of data core 119.

Data included in data core 119 may be arranged such that each section of file data 120-122 is associated with a pointer value. Each pointer value may be generated based on file attribute information 113-115 included in header 112. Such pointers may be implemented at a packet level. For instance, each RSID may be unique compared to each other RSID and may thus allow for identification of a pointer location for each compressed file in data core 119 by searching for the pointer value. Each RSID may be generated based on header 112 information such as file size, file type, file metadata, and/or other appropriate information. RSIDs may be generated using a random binary sequence generation algorithm ("RBSGA") or other suitable technique. Such random, or pseudo-random, techniques may utilize a deterministic algorithm that is difficult to predict and exhibits statistical behavior similar to a random sequence. In this way, the RSID or other pointer value may be difficult or impossible for third parties to generate or extract.

Each file in input file set 101 may be compressed and added to PBC compressed file 102 at a next available location, such as a next byte or address, associated with data core 119. After processing all files in input file set 101, file manager 106 may store or otherwise finalize PBC compressed file 102. In some embodiments, PBC 100 may generate a table or list of processed files, associated RSIDs, and/or other information associated with compression of PBC compressed file 102. Such information may be provided to a requesting resource, such as the example social media application, such that the requesting resource may be able to identify files for retrieval and decompression.

In some embodiments, PBC compressed file 102 may be provided as a plain text file. In some embodiments, elements of PBC compressed file 102 may be uncompressed and/or otherwise not manipulated by PBC 100. For instance, some header 112 information, such as file names, may be stored as plain text. In some embodiments, all information included in PBC compressed file 102 may be compressed, encrypted, obfuscated, or otherwise manipulated such that data therein may not be extracted by a third party.

Figure 2:
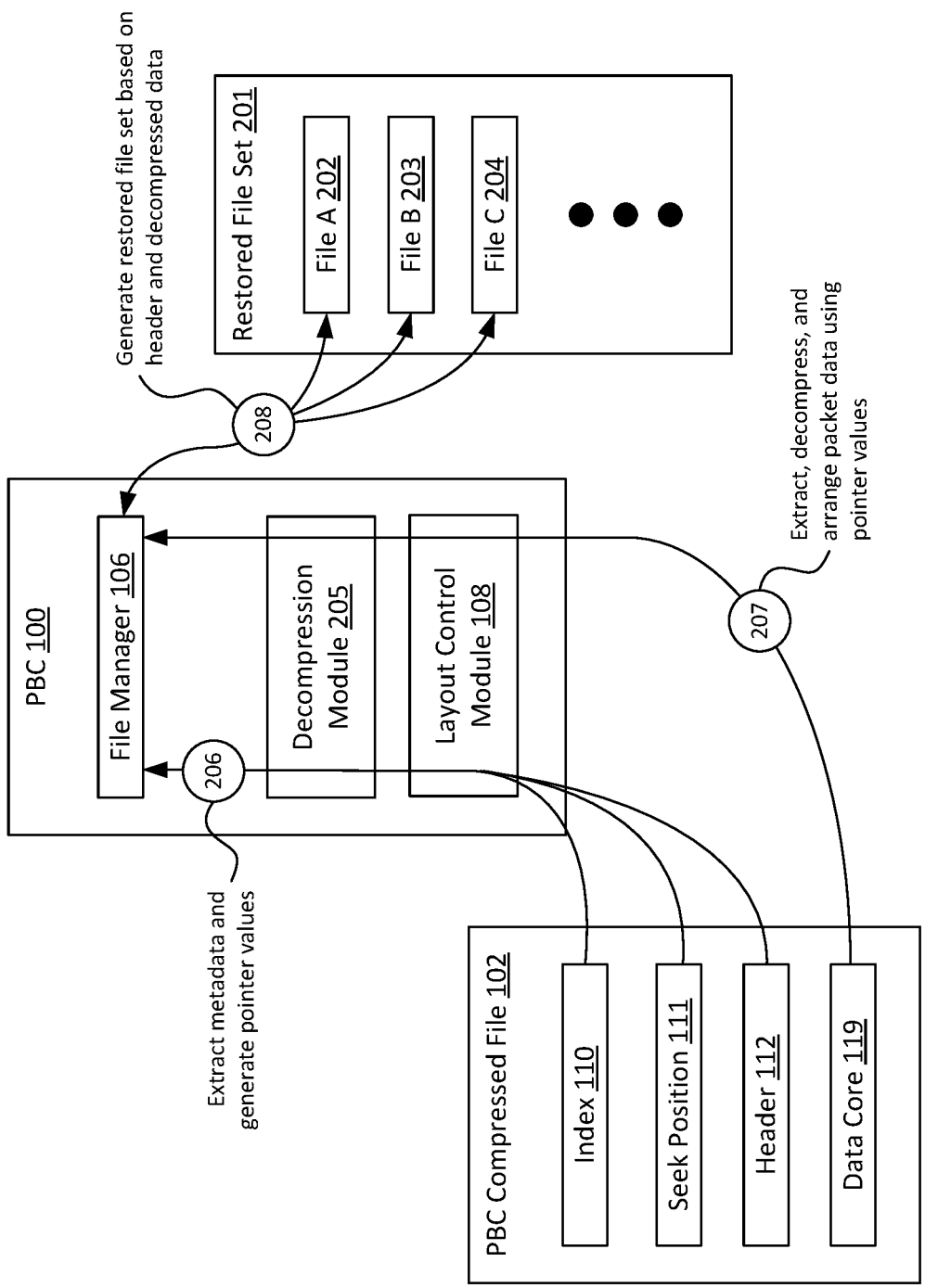
FIG. 2 illustrates an example overview of one or more embodiments described herein, in which a set of files is decompressed using packet-based conversion.

FIG. 2 illustrates, for example, decompression and restoration of a PBC compressed file 102 to a restored file set 201 including one or more restored files 202-204. In this example, restored file A 202 may correspond to input file A 103 from input file set 101, restored file B 203 may correspond to file B 104 from input file set 101, and so on. Restored file set 201, and/or associated files 202-204, may have a same directory structure, size, and/or other attributes of input file set 101, and/or associated input files 103-105. Each restored file 202-204 may have a same type, size, and/or other associated attributes as input files 103-105.

Decompression and restoration may be implemented based on a request received via an interface of PBC 100, such as from an application or service. Depending on the request, all or a subset of files may be restored. For instance, if a request is received for a particular image from a social media application, the image file may be extracted, decompressed, and provided to the social media application. As another example, if a request for a gallery of images is received from the social media application, multiple (or all) of the available files associated with PBC compressed file 102 may be extracted, decompressed, and restored to a file structure associated with the social media application.

As shown, file manager 106 may extract (at 206) metadata and/or other file information from PBC compressed file 102 and generate pointer values associated with files identified in a received request. Index 110, seek position 111, and/or header 112 may be decompressed or otherwise manipulated, as appropriate. A listing of files to be restored may be generated based on the received request, number of files included in PBC compressed file 102, and/or other relevant information. RSIDs or other pointer values may be generated using the same algorithm (e.g., RBSGA) and header 112 data, such as file size, file type, and/or other data or metadata that was used during file compression.

Decompression module 205 may interact with file manager 106 and/or layout control module 108 to extract, decompress, and arrange (at 207) packet data from data core 119 using the generated RSIDs or other pointer values. Each RSID may be used to locate the associated file data, which may then be extracted using a complementary algorithm to that used to compress and/or arrange the file data. File data extraction will be described in more detail in reference to FIG. 4 below.

File manager 106 may interact with decompression module 205 and/or layout control module 108, to generate (at 208) restored file set 201 based on header 112 and decompressed data. Such header 112 data may include, for instance, file type, file name, file size, and/or other relevant attributes. Decompressed data may be received as packets that have been arranged by decompression module 205 and layout control module 108.

Figure 3:
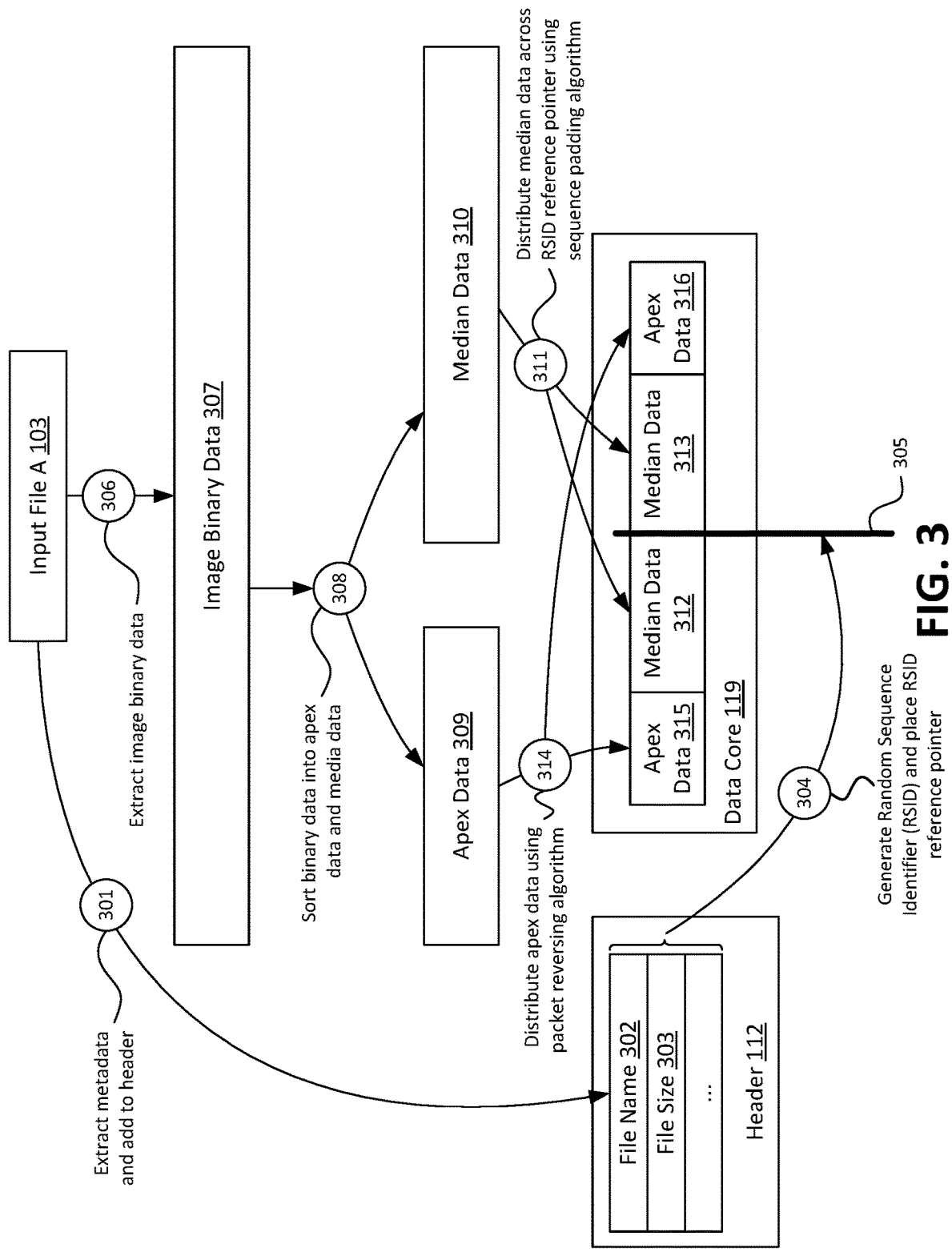
FIG. 3 illustrates an example overview of one or more embodiments described herein, in which a file is compressed using packet-based conversion.

FIG. 3 illustrates, for example, compression of a particular file, input file A 103 from input file set 101, using PBC 100. As shown, PBC 100 may extract (at 301) metadata and/or other file information associated with input file A 103 and add the extracted data to header 112 of PBC compressed file 102. Such data may include, for instance, file name 302, file size 303, and/or other relevant attributes, such as file type, directory or location information, etc.

PBC 100 may generate (at 304) an RSID for input file A 103, and may "place" the RSID as a reference pointer 305 in a "center" location of a section of data core 119 associated with input file A 103, by storing the RSID sequence in the center location (e.g., as binary or text data). The location may be associated with a byte location or other address. The center location, as defined by the RSID, may be used as a reference pointer that is used to place packets during compression (and restore packet order during decompression).

As shown, PBC 100 may extract (at 306) image binary data 307 (and/or other appropriate types of data) from input file A 103. For instance, some embodiments of PBC 100 may utilize vector APIs to read a bitmap of an image represented by input file A 103 and extract vector and/or binary data from input file A 103. Data may be extracted (at 306) in packets or other appropriate sections or units of data.

PBC 100 may sort (at 308) extracted image binary data 307 into apex data 309 and median data 310. Apex data 309 may include, for instance, header information, metadata, and/or other appropriate data from input file A 103. Median data 310 may include, for instance, bitmap or other content or binary data from input file A 103. Different embodiments may delineate between apex and median data in various different ways, such as based on data type, location, etc. In some embodiments, each packet or other unit extracted (at 306) may be designated as apex data 309 or median data 310 at the packet level. In some embodiments, median data 310 may include header information, metadata, and "core" or binary data associated with an input file while apex data 309 may include information such as file length and/or other elements used to generate the RSID.

PBC 100 may distribute (at 311) median data 310 across RSID reference pointer 305 using the SPA or other appropriate algorithm. The SPA may determine whether the RSID is even or odd. Such a determination may be made based on analysis of binary data, such as whether a least significant bit of RSID is set to one or zero. If RSID is based on a file size, RSID may indicate a total number of packets, bytes, or other units of data, where the number may be evaluated to determine whether the number of packets is even or odd. If the sequence type is determined to be even, median data 310 may be split into two even sections 312 and 313, with RSID reference pointer 305 located in the center of the two sections 312 and 313 and each section 312 and 313 having a same number of packets. If the sequence type is determined to be odd, median data 310 may be split with RSID reference pointer 305 located in the center of the two sections 312 and 313 and with one extra packet included in median data section 313.

Data may be split between (or otherwise arranged with respect to) median data sections 312 and 313 using various appropriate techniques. For instance, compressed packets may be placed by alternating between median data sections 312 and 313 as each compressed packet is generated. In some cases, random or filler data may be added to generate a matching number of packets or otherwise implement the even or odd layout. In addition to distributing (at 311)

median data 310, the received median data 310 may be compressed using various appropriate compression algorithms.

PBC 100 may distribute (at 314) apex data 309 using various different arrangements (referred to as "pattern designs"). Apex data 309 may be distributed using various appropriate algorithms. Pattern designs may be associated with various arrangement types, such as palindrome (e.g., a sequence that is the same forwards and backwards), bubble sort (e.g., a sequence sorted by value), etc. Pattern designs and/or pattern matching may be implemented and/or evaluated at the packet level.

Pattern designs may be associated with various "shapes" of data in some embodiments, such as star, box, diamond, square, etc., where each shape defines or identifies sets of locations associated with valid or compressed data. The valid data locations may resemble or otherwise be associated with the various pre-defined shapes or structure types when mapped to a two-dimensional matrix. Such a two-dimensional matrix may have a fixed width, such as a specified number of packets, bits, or bytes and a variable height depending on a total length or amount of apex data 309. Such locations may be defined or specified by bit or byte location, pointer or other address, packet number or identifier, and/or other appropriate location indicators or identifiers. Thus, for example, a "box" shaped pattern design may indicate that the middle two bytes of each row of a four byte wide matrix include valid or compressed data, while the outer two bytes of each four byte wide row include filler or random data.

In some embodiments, PBC 100 may dynamically generate or select, based on the RSID, a pattern design from among a set of available pattern designs. The pattern design may be generated, for example, by comparing portions of the RSID (e.g., a number of bits or bytes) to a lookup table or other resource that indicates available pattern designs.

PBC 100 may distribute (at 314) apex data 309 using a packet reversing algorithm, such as a packets binary reversing algorithm ("PBRA") for a palindrome-type pattern design. The PBRA may receive apex data 309 packets, compress the received packets using any appropriate compression algorithm, and distribute the compressed packets to apex data sections 315 and 316, adjacent to median data sections 312 and 313. The PBRA may be used to generate an apex data section 316 that includes a reverse sequence and apex data section 315 includes a complementary forward sequence. Such a palindrome-type arrangement allows the ends of the apex data sections 315 and 316 to be identified when decompressing file data surrounding RSID reference pointer 305. Data sections 312, 313, 315, 316, and RSID reference pointer 305 may be included in file A data 120. Apex data section 315 and median data section 312 may be referred to as "before", "above", or "left" of RSID reference pointer 305, while median data section 313 and apex data section 316 may be referred to as "after", "below", or "right" of RSID reference pointer 305.

Each file in a file set may be processed in a similar way, with header 112 information placed at regular intervals or otherwise pre-defined locations within PBC compressed file 102 and image binary data 307 generated and placed at a next available location within data core 119. When all files in the file set have been processed, PBC compressed file 102 may be finalized or otherwise defined such that the file is available for extraction and decompression.

Figure 4:
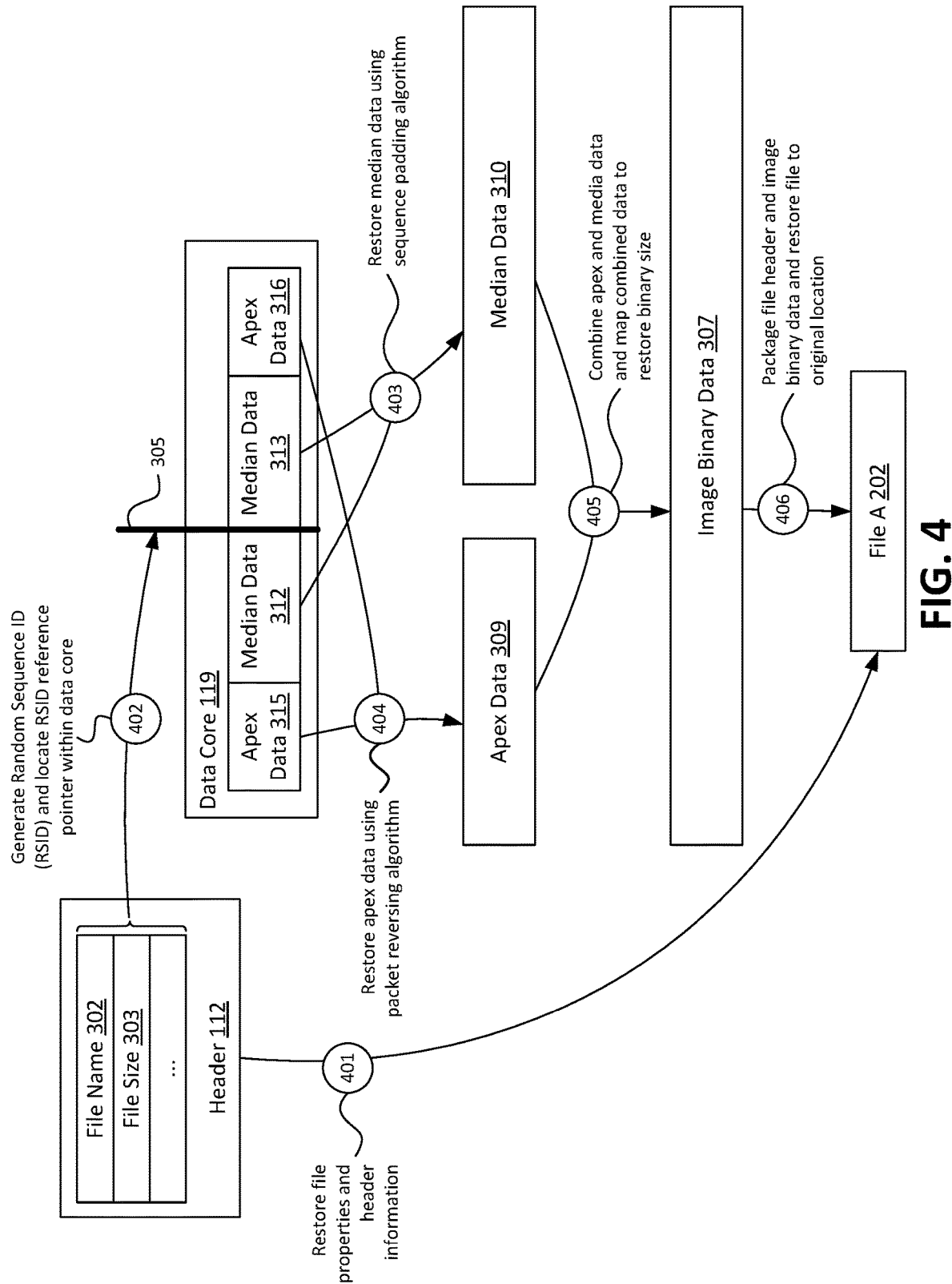
FIG. 4 illustrates an example overview of one or more embodiments described herein, in which a file is decompressed using packet-based conversion.

FIG. 4 illustrates, for example, extraction, decompression, and restoration of a particular file, file A 202, associated with input file A 103. As shown, PBC 100 may restore (at 401) file properties and header information extracted from header 112. Such data may be decompressed, if appropriate. In some cases, header 112 may include a type of compression or other attributes that may be utilized to determine a type of decompression and/or associated parameters to be used to decompress file A 202.

PBC 100 may generate (at 402) an RSID based on the header 112 information (e.g., file name 302 and file size 303) and locate the RSID reference pointer 305 with the data core 119 of PBC compressed file 102. The RSID reference pointer 305 may be located using various appropriate searching and/or matching algorithms. For instance, the RSID may have a pre-defined size, such as a number of bytes. Sets of bytes, including the pre-defined number of bytes, may be extracted from PBC compressed file 102 and compared to the RSID generated for the current file.

In some embodiments, PBC 100 may restore (at 403) median data 310 using a complementary SPA by retrieving median data sections 312 and 313, decompressing the sections, and arranging the retrieved sections depending on the value of the RSID (e.g., whether the RSID is even or odd as described above). Depending on the format of PBC output file 102, other conversion or data processing operations may be performed, such as converting text to binary or hexadecimal.

PBC 100 may restore (at 404) apex data using a complementary packet decompressing algorithm by retrieving apex data sections 315 and 316, decompressing the sections, and arranging the retrieved sections. For instance, a complementary packet reversing algorithm may be utilized for a palindrome-type pattern design. The type of pattern design(s) associated with a particular compressed file (or file section) may be identified based on the RSID in some embodiments. For instance, a portion of the RSID (e.g., a number of bits or bytes) may be compared to a lookup table or other resource that indicates available pattern designs.

Beginning points of apex data sections 315 and 316 may be identified based on extracted header 112 information, such as file size 303, image binary data size, apex data 309 size, median data 310 size, etc. End points of apex data sections 315 and 316 may be identified by comparing packets received from data core 119 to determine if a match is identified (e.g., whether a forward sequence of packet data received from apex data section 315 matches a reverse sequence of packet data received from apex data section 316 for a palindrome-type pattern design). Because the data is compressed and stored in packet order, scanning of apex data sections 315 and 316 may complete as soon as the matching sequence (or other delineation sequence) is identified.

Different embodiments may use different matching patterns in addition to, or in place of, a palindrome pattern. PBC 100 may combine (at 405) apex data 309 and median data 310 and map the combined data to restore binary size to the original value, as indicated by file size 303, for example. PBC 100 may package (at 406) the file header 112 and image binary data 307 in order to restore file A 202 to its original location.

Figure 5:
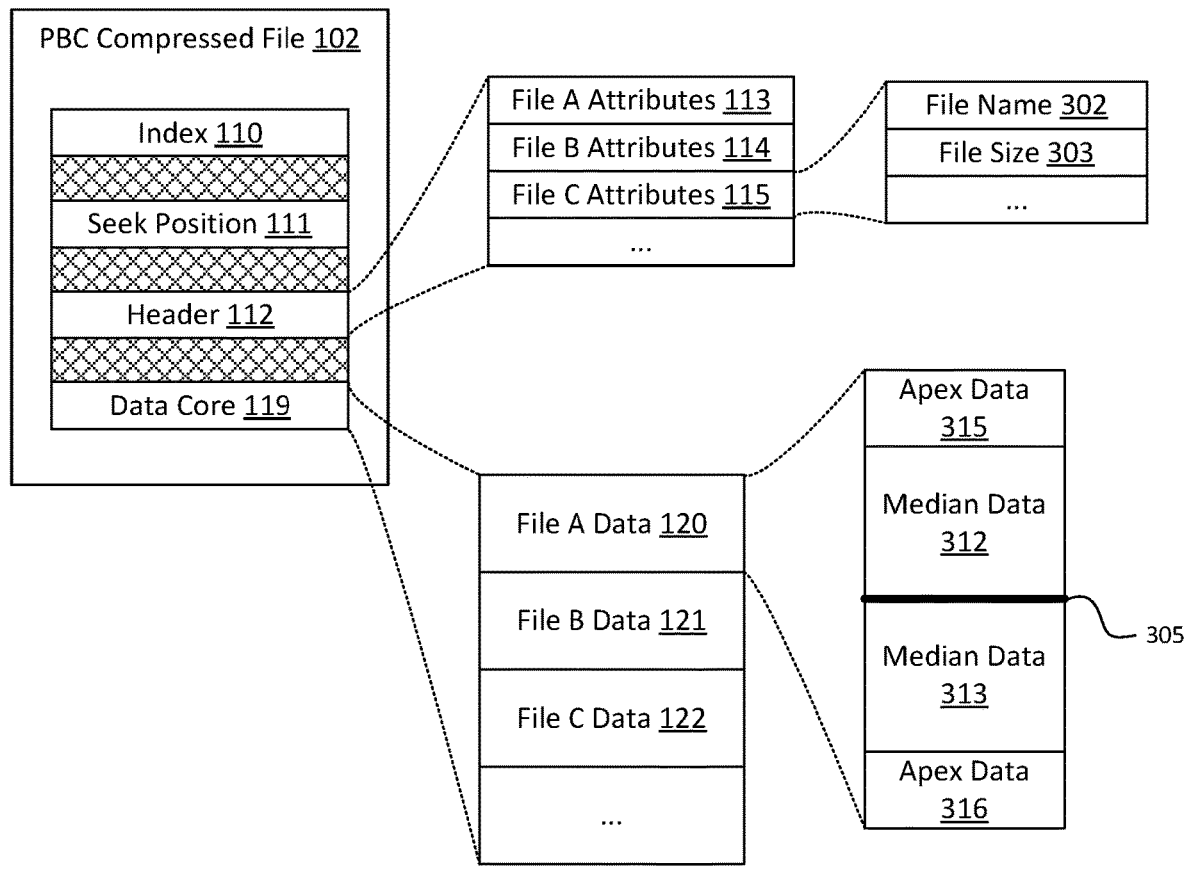
FIG. 5 illustrates an example file structure of one or more embodiments described herein, in which the file structure is associated with a compressed file generated using packet-based compression.

FIG. 5 illustrates an example PBC compressed file 102 structure used by some embodiments. As shown, PBC compressed file 102 may include index 110, seek position 111, header 112, and data core 119. Index 110 may be located at a specific byte or address within PBC compressed file 102. For example, index 110 may be located at a first byte within PBC compressed file 102.

The hatched areas of PBC compressed file 102 may represent offsets including random or filler data. Seek position 111 may be located at a specific byte or address, such as the fifth byte of PBC compressed file 102. Seek position 111 may indicate a start position for header 112. For instance, header 112 may begin at a tenth byte of PBC compressed file 102. The size of header 112 may be determined based on a number of files indicated by index 110. Data core 119 may begin some specified offset from a calculated end location of header 112. For instance, data core 119 may be separated from the end of header 112 by an offset of ten bytes.

File data 120-122 in data core 119 may be arranged as shown. For example, file A data 120 may include apex data sections 315 and 316, median data sections 312 and 313, and RSID reference pointer 305. Each file data section, such as file B data 121 and file C data 122 may be placed at a next address with respect to the end of a preceding data section, such as file A data 120 or file B data 121, with no additional offsets or filler sections.

Figure 6:
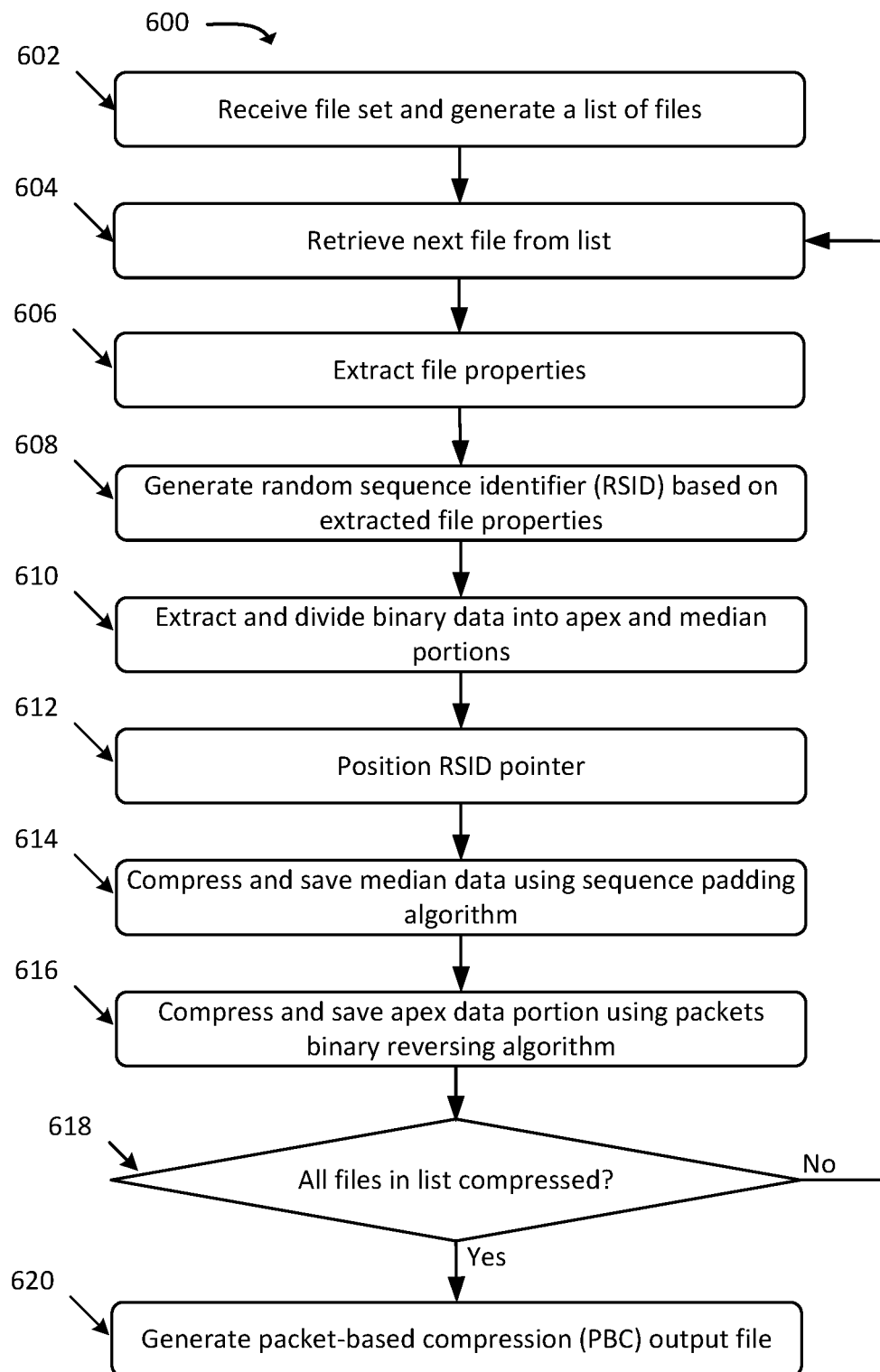
FIG. 6 illustrates an example process for compressing a set of files using packet-based conversion, in accordance with some embodiments.

FIG. 6 illustrates an example process 600 for compressing a set of files using packet-based conversion. In some embodiments, some or all of process 600 may be performed by PBC 100. In some embodiments, one or more other devices may perform some or all of process 600 (e.g., in concert with, and/or in lieu of, PBC 100).

As shown, process 600 may include receiving (at 602) a file set and generating a list of files. Such a file set may be received from a requesting resource such as a UE. The file set may be specified by a directory or folder identifier, and/or other appropriate ways. For instance, a social media application may include a set of files that have been "tagged" as being associated with a particular user. A compression request may include a directory identifier or other location information associated with a file set and filter attributes, such as limits on types of files to include.

A resource such as file manager 106 may analyze the received request and generate a list of files for compression. A PBC compressed output file may be generated and index information, seek information, and/or other relevant and/or available information may be added to the PBC compressed output file.

Process 600 may further include retrieving (at 604) a next file from the list of files. The list of files may be sorted or ordered in various appropriate ways (e.g., alphabetically by name). The list of files may include file identifiers such as file name, unique file identifier or code, and/or other appropriate identifying information associated with each file in the list of files.

Process 600 may additionally include extracting (at 606) file properties of the retrieved file. Such file properties may include, for instance, file name, file size, file type, directory location, and/or other relevant information. File properties may be extracted from file header or metadata information, and/or otherwise determined by a resource such as file manager 106.

Process 600 may also include generating (at 608) an RSID based on the extracted file properties. The RSID may be generated using an algorithm such as the RBSGA, based on information such as file size, file type, metadata, compression arrangement (e.g., palindrome), binary size, and/or other extracted file properties.

Process 600 may further include extracting and dividing (at 610) binary file data from the retrieved file into apex and median portions. Apex data may include information such as file length and/or file attributes or metadata in some embodiments. Median data may include binary file data, header data, and/or metadata in some embodiments.

Process 600 may additionally include positioning (at 612) an RSID pointer in the PBC compressed output file. The RSID value generated (at 608) may be stored as a binary or other appropriate representation to indicate a center location of a section of compressed file information.

Process 600 may also include compressing and saving (at 614) median data using SPA or another appropriate arrangement algorithm. Median data may be arranged such that the center of the data (for even series) or near-center of the data (for odd series) is indicated by the position of the RSID sequence. Median data may be compressed using various appropriate compression algorithms.

Process 600 may further include compressing and saving (at 616) the apex data portion using one or more algorithms such as PBRA and/or other appropriate arrangement algorithms, depending on associated type(s) of pattern design. The type(s) of pattern design may be selected for each file based on the RSID, or a unique pattern design may be generated by combining multiple pattern designs based on the RSID. Apex data may be compressed using various appropriate compression algorithms. The compressed apex and median data portions may be saved to the next available location within data core 119.

Process 600 may additionally include determining (at 618) whether all files in the list have been compressed. If process 600 determines that all files in the list have not been compressed, the process may retrieve (at 604) the next file from the list.

Process 600 may also include generating (at 620) a PBC output file including compressed data associated with the received file set. The PBC output file may be a text file or other appropriate file type. The finalized PBC output file may be stored to various appropriate locations and/or provided to a requesting resource. In addition to the PBC output file, some embodiments of PBC 100 may generate a lookup table or other listing of files included in the PBC output file.

Figure 7:
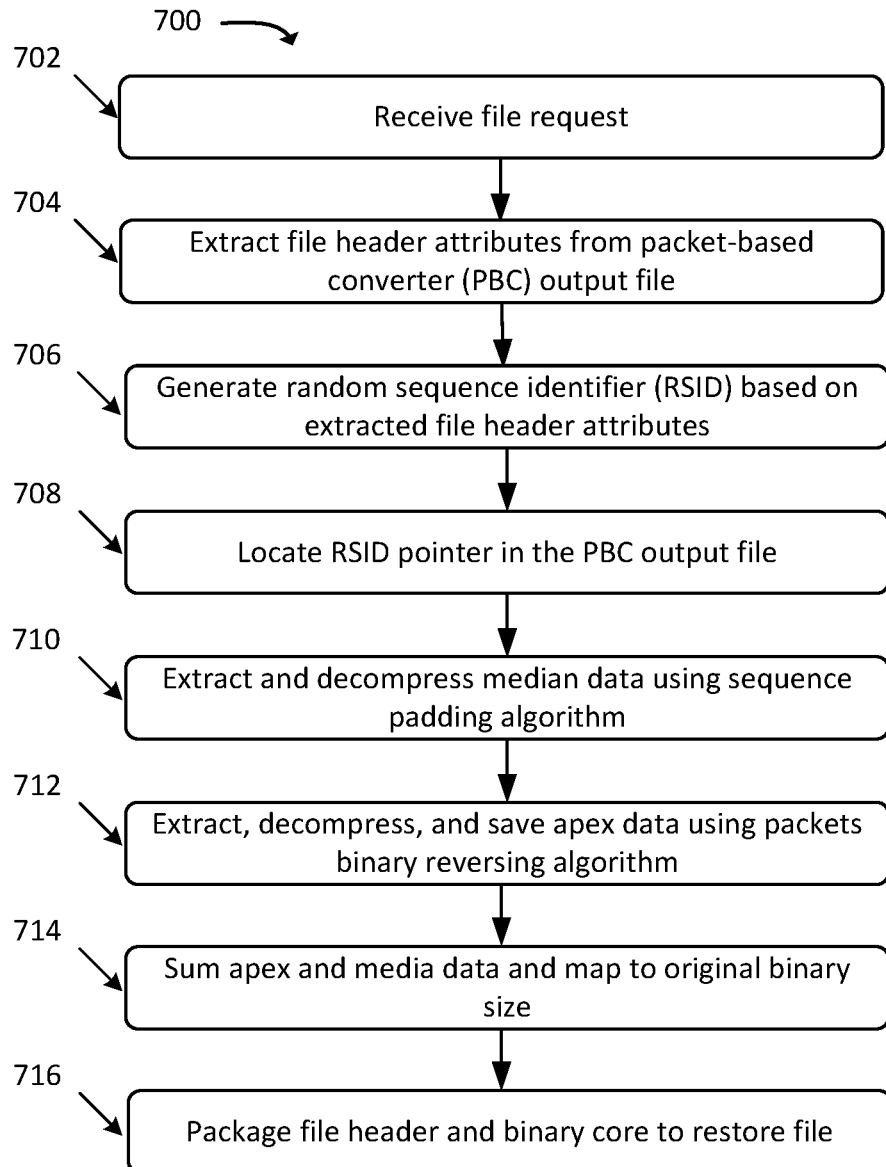
FIG. 7 illustrates an example process for decompressing a set of files using packet-based conversion, in accordance with some embodiments.

FIG. 7 illustrates an example process 700 for decompressing a set of files using packet-based conversion. In some embodiments, some or all of process 700 may be performed by PBC 100. In some embodiments, one or more other devices may perform some or all of process 700 (e.g., in concert with, and/or in lieu of, PBC 100).

As shown, process 700 may include receiving (at 702) a file request. Such a request may be received through various appropriate interfaces of PBC 100, and from various appropriate resources, such as an application, API call, etc. The file request may include information identifying a specific compressed file, such as file identifier, file name, etc. and/or information identifying multiple files, such as a folder name or other filter parameters. In some cases, the file request may include an indication of a PBC compressed file and all files included in the PBC compressed file may be identified as being included in the received file request. In this example, the file request will be described as a request for a single file. Requests including multiple files may be processed in similar ways.

Process 700 may further include extracting (at 704) file header attributes from the PBC output file. As described above, the file header attributes may be arranged within header 112 such that each set of attributes and/or a specific set of attributes may be retrieved.

Process 700 may additionally include generating (at 706) an RSID based on the extracted file header attributes. As described above, the RSID may be generated using an algorithm such as RBSGA, based on specific file attributes, such as file type, file size, etc. The RSID may be generated based at least partly on information such as arrangement type or design, binary size, and/or other information associated with a particular file from a set of requested files. The RSID may be generated based at least partly on attributes such as algorithm type(s), offsets, etc. that may be used to at least partly define the structure of a PBC compressed output file.

Process 700 may also include locating (at 708) the RSID pointer in the PBC output file. The RSID pointer may be located by extracting chunks of data from the PBC output file and comparing each extracted chunk to the RSID pointer until a matching value is identified.

Process 700 may further include extracting and decompressing (at 710) median data using an algorithm such as SPA. Median data packets may be extracted and decompressed in a complementary sequence to the PBRA or other arrangement algorithm used during compression.

Process 700 may additionally include extracting, decompressing, and saving (at 712) apex data packets using an algorithm such as PBRA. File end points may be identified by identifying matching sequence data. For example, in the palindrome example, apex data sections may be defined by forward and reverse matching and end points may be determined based on unmatched data (i.e., when the palindrome-type sequence is broken or terminated). The type of pattern design for each file may be identified based on the RSID.

Process 700 may also include summing (at 714) apex and median data and mapping the summed data to the original binary file size, as specified in retrieved header information.

Process 700 may further include packaging (at 716) file header and binary core data (including median and apex data) to restore the requested file. In this way, the decompressed data may be matched to the original file parameters, such as size, and the decompressed file may be indistinguishable from an associated input file.

Figure 8:
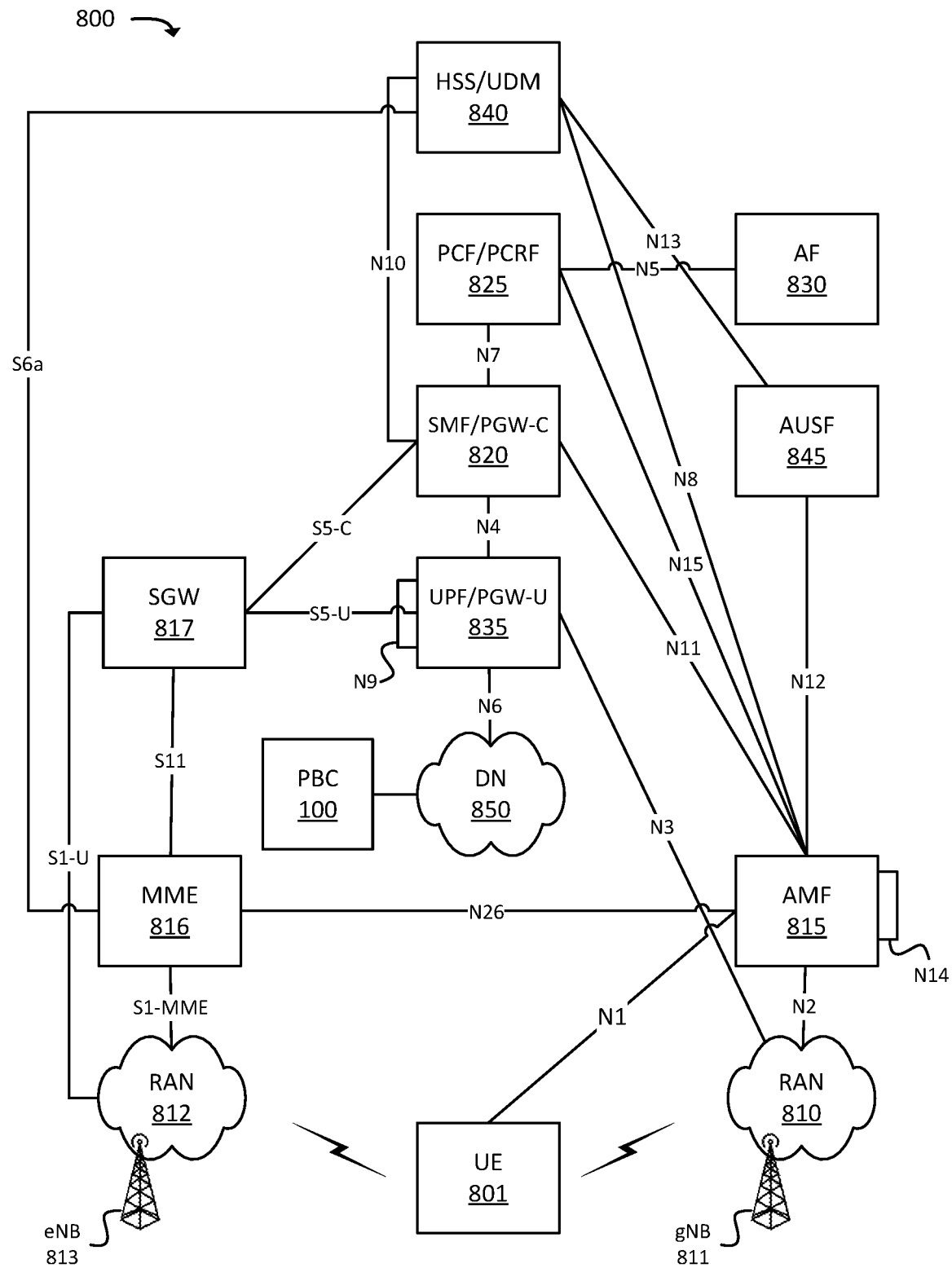
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more Next Generation Node Bs ("gNBs") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850.

The example shown in FIG. 8 illustrates one example of each network component or function (e.g., one instance of SMF/PGW-C 820, PCF/PCRF 825, UPF/PGW-U 835, HSS/UDM 840, and/or 845. In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 801 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate. As shown, PBC 100 may be accessible via DN 850.

Figure 9:
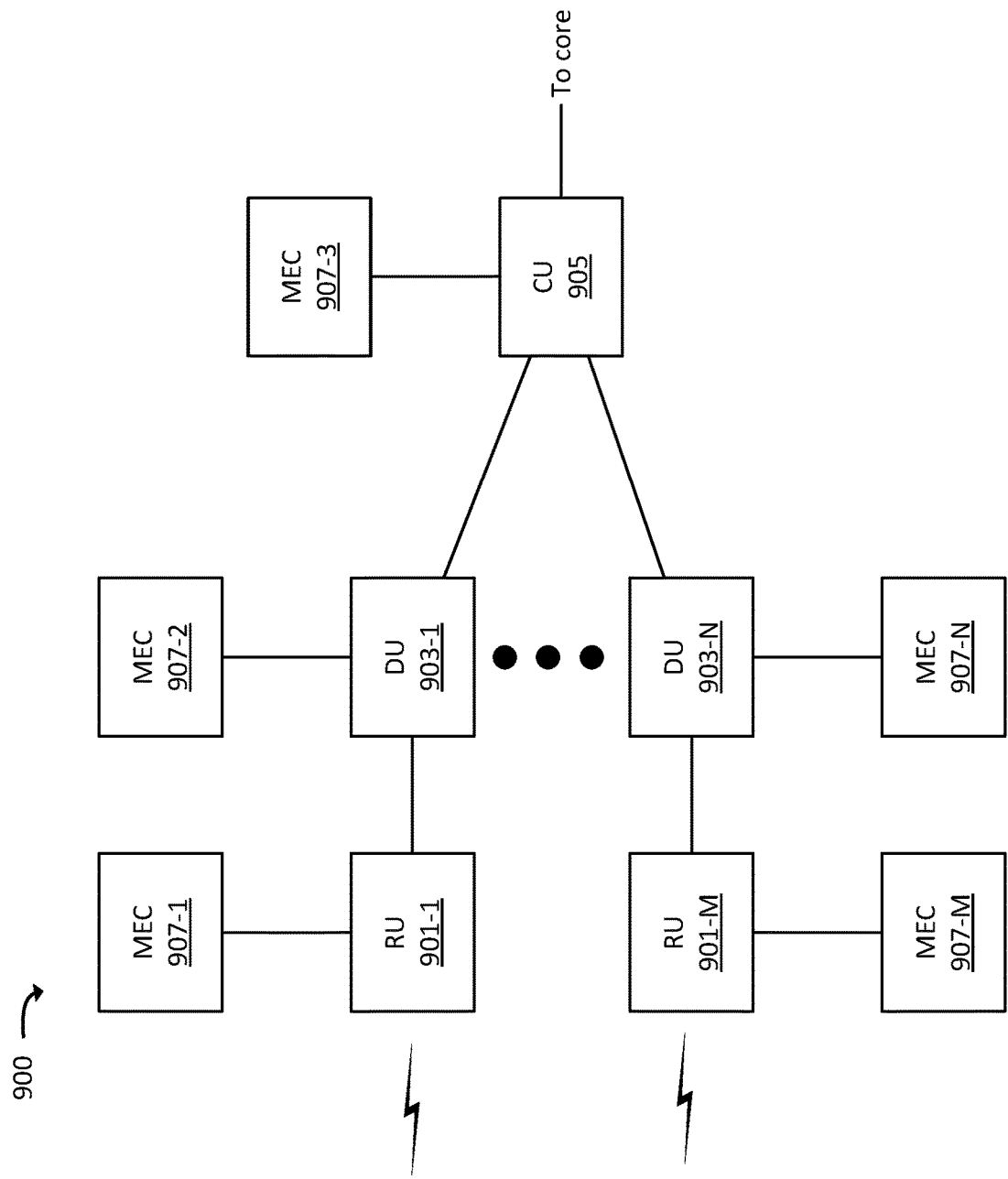
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 907-1 instead of to a core network (e.g., via DU 903 and CU 905). MEC 907-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network.

MEC 907 may include, and/or may implement some or all of the functionality described above with respect to PBC 100.

Figure 10:
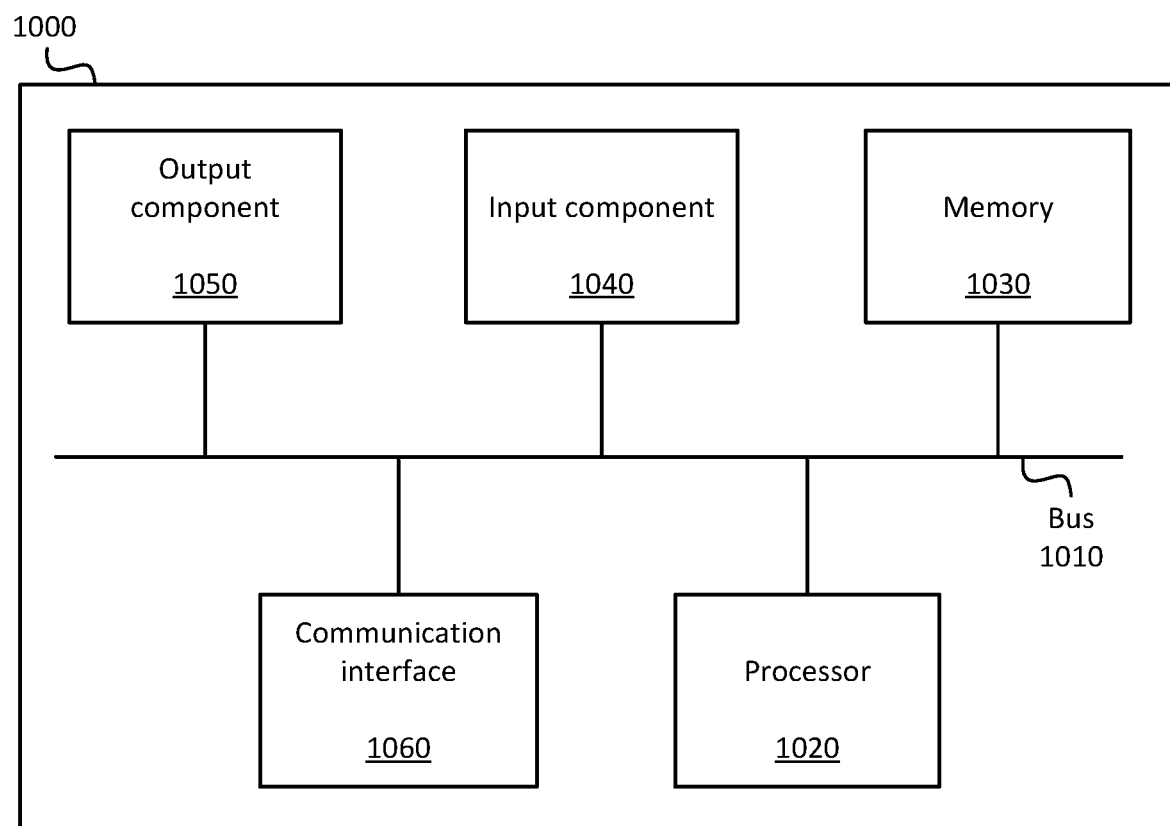
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   generating a first value for a first input file, of a plurality of input files, based on a first set of properties of the first input file;
   generating a second value for a second input file, of the plurality of input files, based on a second set of properties of the second input file;
   generating a first plurality of packets that each include a respective portion of the first input file;
   generating a second plurality of packets that each include a respective portion of the second input file;
   generating an output file that includes:
      the first plurality of packets that are based on the first input file,
      the second plurality of packets that are based on the second input file,
      the first set of properties of the first input file, and
      the second set of properties of the second input file,
   wherein a sequence of the packets of the first and second pluralities of packets in the output file is based on the first and second values; and
   providing the output file to a device, wherein the device:
      determines the first and second values based on the first and second sets of properties of the first and second input files, as included in the output file,
      determines the sequence of the packets in the output file based on the first and second values,
      extracts the first plurality of packets from the output file based on the determined sequence of the packets in the output file, and
      restores the first input file based on the extracted first plurality of packets and the determined sequence.

2. The method of claim 1, wherein the output file includes a plurality of addresses, wherein the sequence of the packets indicates particular addresses at which respective packets, of the first and second pluralities of packets, are located within the output file.

3. The method of claim 1, wherein the first value includes a first random sequence identifier, and wherein the second value includes a different second random sequence identifier.

4. The method of claim 1, further comprising:
   identifying header data associated with the first input file; and
   identifying content data associated with the first input file,
   wherein generating the output file includes:
      arranging a first portion of the first plurality of packets, that corresponds to the header data associated with the first input file, in a first arrangement in the output file; and
      arranging a second portion of the first plurality of packets, that corresponds to the content data associated with the first input file, in a second arrangement in the output file.

5. The method of claim 1, further comprising:
   generating filler data,
   wherein generating the output file further includes placing the filler data in the output file.

6. The method of claim 1, further comprising:
   determining a pattern based on the first value, wherein generating the output file includes distributing packets, of the first plurality of packets, within the output file based on the determined pattern.

7. A first device, comprising:
   one or more processors configured to:
      generate a first value for a first input file, of a plurality of input files, based on a first set of properties of the first input file;
      generate a second value for a second input file, of the plurality of input files, based on a second set of properties of the second input file;
      generate a first plurality of packets that each include a respective portion of the first input file;
      generate a second plurality of packets that each include a respective portion of the second input file;
      generate an output file that includes:
         the first plurality of packets that are based on the first input file,
         the second plurality of packets that are based on the second input file,
         the first set of properties of the first input file, and
         the second set of properties of the second input file,
      wherein a sequence of the packets of the first and second pluralities of packets in the output file is based on the first and second values; and provide the output file to a second device, wherein the second device:
- determines the first and second values based on the first and second sets of properties of the first and second input files, as included in the output file,
- determines the sequence of the packets in the output file based on the first and second values,
- extracts the first plurality of packets from the output file based on the determined sequence of the packets in the output file, and
- restores the first input file based on the extracted first plurality of packets and the determined sequence.

8. The first device of claim 7, wherein the output file includes a plurality of locations, wherein the sequence of the packets indicates particular locations at which respective packets, of the first and second pluralities of packets, are located within the output file.

9. The first device of claim 8, wherein the plurality of locations of the output file include a plurality of bit or byte addresses.

10. The first device of claim 7, wherein the first value includes a first random sequence identifier, and wherein the second value includes a different second random sequence identifier.

11. The first device of claim 7, wherein the one or more processors are further configured to:
identify header data associated with the first input file; and
identify content data associated with the first input file,
wherein generating the output file includes:
- arranging a first portion of the first plurality of packets, that corresponds to the header data associated with the first input file, in a first arrangement in the output file; and
- arranging a second portion of the first plurality of packets, that corresponds to the content data associated with the first input file, in a second arrangement in the output file.

12. The first device of claim 7, wherein the one or more processors are further configured to:
generate filler data,
wherein generating the output file further includes placing the filler data in the output file.

13. The first device of claim 7, wherein the one or more processors are further configured to:
determine a pattern based on the first value, wherein generating the output file includes distributing packets, of the first plurality of packets, within the output file based on the determined pattern.

14. A non-transitory computer-readable medium, storing a plurality of processor-executable instructions to:
generate a first value for a first input file, of a plurality of input files, based on a first set of properties of the first input file;
generate a second value for a second input file, of the plurality of input files, based on a second set of properties of the second input file;
generate a first plurality of packets that each include a respective portion of the first input file;
generate a second plurality of packets that each include a respective portion of the second input file;
generate an output file that includes:
- the first plurality of packets that are based on the first input file,
- the second plurality of packets that are based on the second input file,
- the first set of properties of the first input file, and
- the second set of properties of the second input file,
wherein a sequence of the packets of the first and second pluralities of packets in the output file is based on the first and second values; and
provide the output file to a device, wherein the device:
- determines the first and second values based on the first and second sets of properties of the first and second input files, as included in the output file,
- determines the sequence of the packets in the output file based on the first and second values,
- extracts the first plurality of packets from the output file based on the determined sequence of the packets in the output file, and
- restores the first input file based on the extracted first plurality of packets and the determined sequence.

15. The non-transitory computer-readable medium of claim 14, wherein the output file includes a plurality of locations, wherein the sequence of the packets indicates particular locations at which respective packets, of the first and second pluralities of packets, are located within the output file.

16. The non-transitory computer-readable medium of claim 15, wherein the plurality of locations of the output file include a plurality of bit or byte addresses.

17. The non-transitory computer-readable medium of claim 14, wherein the first value includes a first random sequence identifier, and wherein the second value includes a different second random sequence identifier.

18. The non-transitory computer-readable medium of claim 14, wherein the plurality of processor-executable instructions further include processor-executable instructions to:
identify header data associated with the first input file; and
identify content data associated with the first input file,
wherein generating the output file includes:
- arranging a first portion of the first plurality of packets, that corresponds to the header data associated with the first input file, in a first arrangement in the output file; and
- arranging a second portion of the first plurality of packets, that corresponds to the content data associated with the first input file, in a second arrangement in the output file.

19. The non-transitory computer-readable medium of claim 14, wherein the plurality of processor-executable instructions further include processor-executable instructions to:
generate filler data,
wherein generating the output file further includes placing the filler data in the output file.

20. The non-transitory computer-readable medium of claim 14, wherein the plurality of processor-executable instructions further include processor-executable instructions to:
determine a pattern based on the first value, wherein generating the output file includes distributing packets, of the first plurality of packets, within the output file based on the determined pattern.

* * * * *